United States Patent [19]
Rose et al.

[11] Patent Number: 5,615,985
[45] Date of Patent: Apr. 1, 1997

[54] COLLATED FASTENER STRIP

[75] Inventors: Barbara A. Rose, West Chester; Ronald B. Fite, Milford, both of Ohio; Alan W. Ray, Valdese, N.C.

[73] Assignee: Senco Products, Inc., Cincinnati, Ohio

[21] Appl. No.: 461,155

[22] Filed: Jun. 5, 1995

[51] Int. Cl.⁶ ........................................... F16B 15/08
[52] U.S. Cl. ................................... 411/442; 411/443
[58] Field of Search .................................. 411/442, 443, 411/444, 487; 206/343–345, 820

[56] References Cited

U.S. PATENT DOCUMENTS

| | | |
|---|---|---|
| 1,378,550 | 5/1921 | Miller . |
| 1,733,506 | 10/1929 | Maynard ................................. 411/444 |
| 3,082,425 | 3/1963 | Leslie . |
| 3,252,569 | 5/1966 | Mathews . |
| 3,348,669 | 10/1967 | Powers ................................... 411/443 |
| 3,828,924 | 8/1974 | Perkins ................................... 206/343 |
| 3,954,176 | 5/1976 | Haytayan ............................... 206/820 |
| 4,664,733 | 5/1987 | Masago .................................. 411/443 |

FOREIGN PATENT DOCUMENTS

| | | | |
|---|---|---|---|
| 703387 | 2/1965 | Canada .................................. 411/442 |
| 1407442 | 6/1965 | France ................................... 411/444 |
| 8808087 | 10/1988 | WIPO ................................... 411/443 |

Primary Examiner—Darnell M. Boucher
Assistant Examiner—Gary Estremsky
Attorney, Agent, or Firm—Jerrold J. Litzinger

[57] ABSTRACT

A collated fastener strip for use in a pneumatic fastener driving tool of the type having a magazine containing parallel spaced grooves for accommodating the heads of fasteners as they are fed within the magazine. The strip comprises a plurality of headless fasteners with at least one headed fastener positioned near the end of the strip such that the strip may be used in a magazine designed for using headed fasteners.

16 Claims, 2 Drawing Sheets

COLLATED FASTENER STRIP

BACKGROUND OF THE INVENTION

1. Field of the Invention

The present invention relates generally to a collated fastener strip and, in particular, to an improved collated strip of headless or slight headed nails which can be used in magazines of pneumatic fastener driving tools which are designed to accept headed nails.

2. Description of the Prior Art

The use of pneumatic fastener driving tools have become very popular in all instances where it is necessary to fasten pieces of wood together. Workers in industries such as house construction and furniture manufacturing regularly use these tools to increase productivity as well as improve quality and appearance. An example of one such tool is taught in U.S. Pat. No. 5,368,213, which is assigned to the assignee of the present invention and is hereby incorporated by reference. This tool is of the type generally characterized as having a guide body extending laterally from the pneumatic member at a forward end and including a driver extending from the pneumatic member through a drive channel in the guide body. A magazine is affixed to the underside of the pneumatic member with an open feed end extending into the guide body and having a tensioning mechanism for feeding fasteners into the drive channel.

The magazine taught in the '213 patent contains a series of complimentary parallel grooves on either side of the pathway which carries the fasteners as they are fed into the drive channel. These grooves accommodate the heads of the fasteners as they are transported toward the drive channel of the tool under the force of the tensioning mechanism, providing stability and support for the feeding of the fasteners and adding to the overall reliability of the operation of this tool.

Headless or slight headed nails, often called "finish" nails in the trade, are used for attaching trim boards, assembling furniture, and in other applications where headed fasteners would be unsightly or may contribute to marring the finish of the workpiece when they are applied. The holding power of headless nails, however, is considerably less than that provided by headed nails; therefore, they are normally used in performing finish work, where holding forces needed are not as critical.

One shortcoming of a tool of the type described in the '213 patent is that it cannot reliably drive headless fasteners, as this type of fastener has a tendency to jam the tool, as the absence of the head on the fastener for guidance in the magazine grooves allows undesired movement of the fastener strip as it is advanced within the magazine.

This problem has been addressed several times in the prior art. U.S. Pat. No. 3,720,364, which issued in 1973 to Maestri, describes a fastener driving tool which has a magazine designed for driving headless nails of different lengths. This is accomplished by the use of movable members which are selectively advanced into position and locked to create an acceptable passageway for different sizes of headless nails.

U.S. Pat. No. 4,174,802, which issued in 1979 to Maestri, describes a magazine for a fastener driving tool which can accommodate nails of different lengths and head sizes. The side wall of the magazine is adjustable such that it can be positioned to guide the nails by the point and sides of the nail strip.

Although these prior art references teach several magazines which are capable of driving both headed and headless nails, each has particular deficiencies in the complexity in the design of its magazine and the operation to accommodate different sizes of nails.

SUMMARY OF THE INVENTION

It is, therefore, an object of the present invention to provide an improved fastener strip which allows the use of headless nails in a magazine designed to use headed nails.

It is also an object of the present invention to provide an improved headless nail which has increased holding power over the standard headless nail.

These and other objects of the present invention are accomplished by a novel collated fastener strip for use in a fastener driving tool having a magazine which contains opposing grooves for accommodating the head of a fastener, said strip comprising a plurality of headless nails collated in a row with at least one headed nail positioned at the end of the strip. In addition, the headless nails may contain a portion having a slight undulation in its shank near its top end which improves the holding power of the fastener.

DETAILED DESCRIPTION OF THE PREFERRED EMBODIMENTS

Referring more particularly to the drawings, there is shown therein a collated nail strip, generally indicated at 10, which embodies the principles of the present invention. Nail strip 10 comprises a plurality of individual headless nails 10a of similar construction and configuration having elongated generally parallel shanks which are collated side-by-side using well known conventional techniques, such as adhesives, paper tape, or thermoplastic strips, to form a strip in which the bottom end or points 11a are located in the same plane essentially perpendicular to the plane formed by strip 10, as are the top end or flat 11b of each of the nails 10a.

Figure 1:
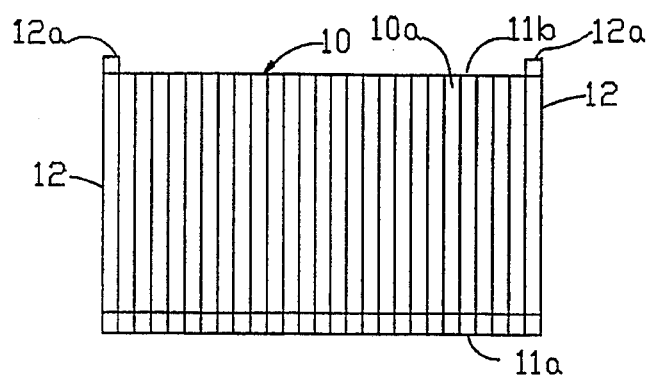
FIG. 1 is a side elevational view of the collated nail strip of the present invention.
Figure 2:
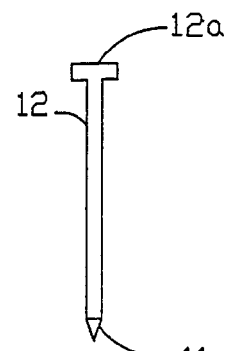
FIG. 2 is a left end view of the nail strip of FIG. 1.

Referring now to FIGS. 1 and 2, it can be seen that a nail 12 is located at each end of nail strip 10 containing a head 12a which is located above a plane which passes through the top end 11b of all of the remaining nails, which are headless, in nail strip 10. Head 12a of each nail 12 is used to position nail strip 10 within a conventional magazine assembly having complimentary opposing grooves by locating within a groove corresponding to the length of nail 12.

To use nail strip 10 in a fastener driving tool, strip 10 is loaded into the magazine by positioning each head 12a of nails 12 within the appropriate groove for a headed nail the size of nail 12, and positioning points 11a of strip 10 within the track base of the magazine. This is done when the tensioning mechanism used for feeding the fasteners into the drive track has been disabled. When the loading has been accomplished, the tensioning mechanism is activated, forcing nail strip 10 forward in the magazine until nail 12 at the forward end is positioned under tension against the guide body within the drive track underneath the driver. When a fastener is to be driven, the driver contacts the top of the nail within the drive track, shearing it from the strip and driving it from the guide body of the tool into the workpiece. When the driver returns to the idle position, the tensioning mechanism within the magazine positions the next nail in strip 10 into the drive track underneath the driven, and holds strip 10 in proper position within the magazine by forcing strip 10 against the guide body. Control of strip 10, particularly during the drive cycle when the nail in the drive track is sheared from the strip, is effected by the positioning of nail head 12a of nail 12 at the end of strip 10 within the proper groove of the magazine combined with the tensioning mechanism applying a force which pushes strip 10 against the front plate of the guide body.

Figure 3:
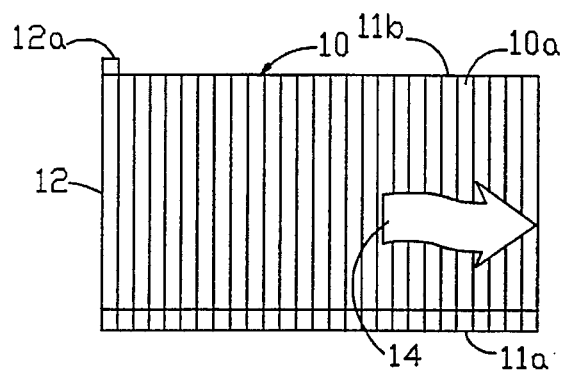
FIG. 3 is a side elevational view of an alternative embodiment of the nail strip of the present invention.
Figure 4:
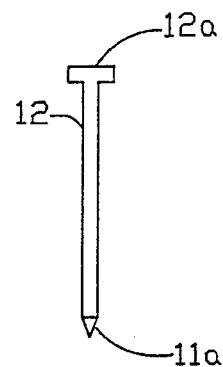
FIG. 4 is a left end view of the nail strip of FIG. 3.

FIGS. 3 and 4 illustrate a second embodiment of the collated nail strip of the present invention. As seen in FIG. 3, strip 10 contains a headed nail 12 at only one end of the strip. Consequently, it is important that strip 10 be placed into the magazine in the proper orientation, as nail 12 of strip 10 must be positioned at the end away from the guide body of the tool to function properly. Therefore, an indicating means 14, such the arrow shown in FIG. 3, is placed on strip 10 to assist in properly positioning strip 10 within the magazine.

Figure 5:
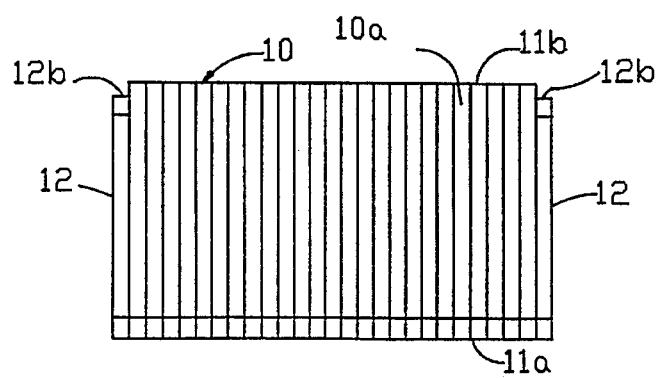
FIG. 5 is a side elevational view of another alternative embodiment of the nail strip of the present invention.
Figure 6:
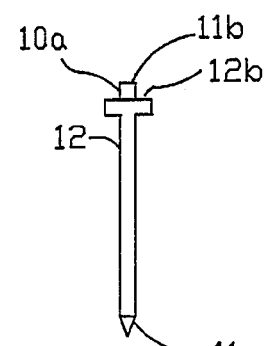
FIG. 6 is a left end view of the nail strip of FIG. 5.

FIGS. 5 and 6 illustrate another embodiment of the present invention. Referring now to FIG. 5, collated fastener strip 10 contains a nail 12 having a head 12b at each end. While points 11a of strip 10 are all located in the same plane, heads 12b of nails 12 are located below a plane which passes through the top end 11b of the headless nails in strip 10.

Figure 7:
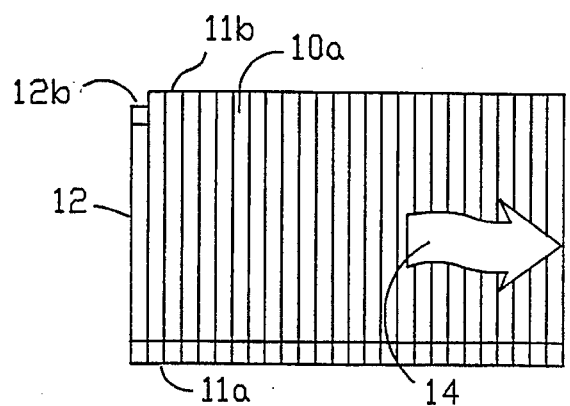
FIG. 7 is a side elevational view of another alternative embodiment of the nail strip of the present invention.
Figure 8:
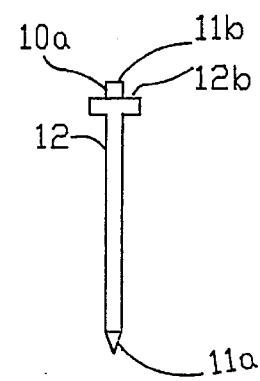
FIG. 8 is a left end view of the nail strip of FIG. 7.

FIGS. 7 and 8 illustrate still another embodiment of the collated nail strip of the present invention. As seen in FIG. 7, strip 10 contains a headed nail 12 at only one end of the strip, with head 12b of nail 12 located below the plane which passes through top end 11b of the headless nails in strip 10. Consequently, it is important that strip 10 be placed into the magazine in the proper orientation, as nail 12 of strip 10 must be positioned at the end away from guide body of the tool to function properly. Therefore, an indicating means 14 is placed somewhere on strip 10 to assist in properly positioning strip 10 within the magazine.

Fastener strip 10 of its present invention may be manufactured in several different manners. One method of manufacture uses a conventional bandline in which a series of parallel metallic wires are adhered together to form a band which is cut and stamped to form a strip 10 of headless nails, with the nail 12 at either one or both ends having a head formed thereon. Alternatively, nail 12 can be adhered to an existing nail strip 10 in an additional step.

Figure 9:
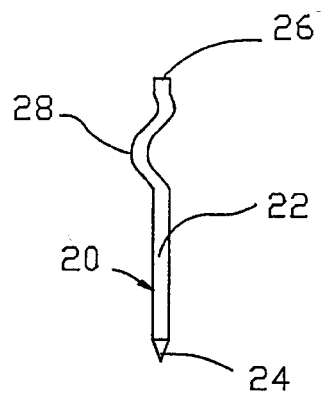
FIG. 9 is an elevational view of a headless nail which may be used in the nail strip of the present invention.

Referring now to FIG. 9, there is shown a headless fastener which may be used in the collated strip of the present invention. Fastener 20 consists of an elongated shank 22 having a end or point 24 at one end thereof suitable for penetrating a workpiece and a flat top 26 at its opposite end which is suitable for being contacted by the driver of a fastener driving tool. On a section of shank 22 spaced apart from top 26 there is a slight undulation 28. Undulation 28 is S shaped and is slightly removed from a plane extending through top 26 and end 24.

In operation, when fastener 20 is driven into a workpiece, undulation 20 applies an additional force to the fibers of the wood or other compressible material into which it is driven than the force generated by a fastener with a smooth or straight shank. This additional force adds extra resistance to the withdrawal of the fastener from the workpiece, giving fastener 20 added holding power over a standard finish nail.

While the invention has been shown and described in terms of several embodiments, thereof, it will be understood that this invention is not limited to these particular embodiments and that many changes and modifications may be made without departing from the true spirit and scope of the invention as defined in the appended claims.

What is claimed is:

1. A collated strip of fasteners for use in a pneumatic fastener driving tool having a magazine containing a series of parallel grooves for accommodating the head of a headed fastener, said strip comprising:

a plurality of essentially headless fasteners having elongated shanks arranged in side by side abutting relationship, with each fastener having a surface configured to penetrate a workpiece at one end thereof and a flat surface at the opposite end thereof, wherein said plurality of fasteners are adhered together to form a fastener strip having a forward end and a rearward end;

and at least one headed fastener having an elongated shank and a head which is capable of being supported within a parallel groove within a magazine of a fastener driving tool, with said second headed fastener located within said fastener strip near its rearward end;

whereby said fastener strip is operable to be used in the magazine of a fastener driving tool containing a series of parallel grooves.

2. The collated fastener strip of claim 1, further comprising means positioned on one side of said strip to indicate the proper orientation of said strip within the magazine of said fastener driving tool.

3. The collated strip of claim 1, further comprising at least one second fastener having an elongated shank and a head which is capable of being supported within a parallel groove within the magazine of a fastener driving tool, with said second headed fastener located within said fastener strip near its forward end.

4. The collated strip of claim 1, wherein said fastener strip is formed by adhering said elongated shanks together with an adhesive coating.

5. The collated strip of claim 1, wherein said fastener strip is formed by adhering said elongated shanks together with an adhesive tape applied along one side of said elongated shanks.

6. The collated strip of claim 1, wherein the head of said at least one headed fastener is positioned above a plane which extends through said flat surfaces of said plurality of headless fasteners.

7. The collated strip of claim 1, wherein the head of said at least one headed fastener is positioned below a plane which extends through said flat surfaces of said plurality of headless fasteners.

8. The collated strip of claim 1, wherein said at least one headed fastener is located at the rearward end of said strip.

9. The collated strip of claim 3, wherein said at least one headed fastener is located at the rearward end of said strip, and the at least one headed second fastener is located at the forward end of said strip.

10. The collated strip of claim 1, wherein the elongated shanks of said plurality of headless fasteners each contain an undulation near the flat surface end of said fastener.

11. The collated strip of claim 10, wherein the undulation of said elongated shanks of said plurality of headless fasteners is S shaped.

12. The collated strip of claim 1, wherein said surface of said plurality of fasteners of said fastener strip configured to penetrate a workpiece is V shaped.

13. A collated strip of nails for use in a pneumatic nail driving tool having a magazine containing a series of parallel grooves for accommodating the head of a headed nail, said strip comprising:

a plurality of essentially headless nails having generally parallel elongated shanks arranged in side-by-side abutting relationship, with each nail having a surface configured to penetrate a workpiece at one end thereof and a flat surface at the opposite end thereof, with each of said generally parallel elongated shanks having an undulation near said flat surface end thereof, wherein said plurality of nails are adhered together to form a nail strip having a forward end and a rearward end; and at least one headed nail having a head which is capable of being supported within a parallel groove within a magazine of a nail driving tool, with said headed nail located within said nail strip near its rearward end; whereby said nail strip is operable to be used in the magazine of a nail driving tool containing a series of parallel grooves.

14. The collated nail strip of claim 13, further comprising at least one second nail having a head which is capable of being supported within a parallel groove within the magazine of a nail driving tool, with said second nail located within the nail strip near its forward end.

15. The collated nail strip of claim 13, wherein the head of said at least one headed nail is positioned above a plane which extends through said flat surfaces of said plurality of headless nails.

16. The collated nail strip of claim 13, wherein the head of said at least one headed nail is positioned below a plane which extends through said flat surfaces of said plurality of headless nails.

* * * * *